United States Patent [19]

Shiga et al.

[11] Patent Number: 5,071,563

[45] Date of Patent: Dec. 10, 1991

[54] METHOD FOR REMOVING SULFATE IONS FROM AQUEOUS SOLUTION OF ALKALI METAL CHLORIDE

[75] Inventors: Minoru Shiga, Himeji; Toshiji Kano, Kakogawa; Takamichi Kishi, Himeji, all of Japan

[73] Assignee: Kanegafuchi Kagaku Kogyo Kabushiki Kaisha, Osaka, Japan

[21] Appl. No.: 606,270

[22] Filed: Oct. 31, 1990

[30] Foreign Application Priority Data

Nov. 9, 1989 [JP] Japan .................................. 1-291968

[51] Int. Cl.$^5$ ............................................. B01D 15/04
[52] U.S. Cl. ...................................... 210/670; 210/683
[58] Field of Search ................................ 210/670, 683

[56] References Cited

U.S. PATENT DOCUMENTS

| | | | |
|---|---|---|---|
| 3,332,737 | 7/1967 | Kraus | 210/683 |
| 4,405,576 | 9/1983 | Lee et al. | 423/181 |
| 4,415,677 | 11/1983 | Lee et al. | 521/28 |
| 4,415,678 | 11/1983 | Lee et al. | 521/28 |
| 4,488,949 | 12/1984 | Lee et al. | 521/28 |

FOREIGN PATENT DOCUMENTS 60-44056 3/1985 Japan .

*Primary Examiner*—Ivars Cintins
*Attorney, Agent, or Firm*—Armstrong, Nikaido, Marmelstein, Kubovcik & Murray

[57] ABSTRACT

A method for removing sulfate ions from an aqueous solution of an alkali metal chloride is disclosed, in which the aqueous solution of the alkali metal chloride containing sulfate ions and zirconium hydrous oxide are brought into contact with each other in a slurry form under acidic conditions to thereby cause the sulfate ions to be adsorbed to the zirconium hydrous oxide by an ion exchange reaction, the zirconium hydrous oxide adsorbing sulfate ions is separated from the aqueous solution and then dispersed in another aqueous liquid to thereby cause it to react with an alkali so as to cause sulfate ions to be desorbed into the aqueous liquid. According to this method, adsorption and desorption take place rapidly and efficiently.

5 Claims, No Drawings

METHOD FOR REMOVING SULFATE IONS FROM AQUEOUS SOLUTION OF ALKALI METAL CHLORIDE

BACKGROUND OF THE INVENTION

1. Field of the Invention

The present invention relates to a method for removing sulfate ions from an aqueous solution of an alkali metal chloride.

2. Description of the Prior Art

When an aqueous solution of an alkali metal hydroxide, chlorine and hydrogen are manufactured by electrolyzing an aqueous solution of an alkali metal chloride (hereinafter called "brine"), it is necessary to remove sulfate ions which penetrate into the brine system mainly from the alkali metal chloride used as a raw material.

As methods for removing sulfate ions from the brine, a barium salt method, a calcium salt method, a freezing method, a brine purge method, etc. are known, but these have the following disadvantages. That is, in the case of the barium salt method, barium chloride, barium carbonate, etc. used as additives are toxic and also expensive, in the cases of the calcium salt method and the freezing method, the removal rate is lowered when the concentration of sulfate ions in the brine is desirably controlled at a low level, thus resulting in increasing cost, and in the case of the brine purge method, a loss of alkali metal chloride increases when the concentration of sulfate ions in the brine is desirably controlled at a low level, resulting in increasing cost.

Recently, as a method displacing these methods, there is known a sulfate ion adsorption method, which is disclosed in, for example, Japanese Laid-Open Patent Publication No. 44056/85 and Japanese Laid-Open Patent Publication No. 228691/85). These methods, however, have the following disadvantages.

The method disclosed in Japanese Laid-Open Patent Publication No. 44056/85 consists in removing sulfate ions from brine by a macroporous cation exchange resin composite having polymeric zirconium hydrous oxide in a vessel. In this method, water is used for regeneration of the polymeric zirconium hydrous oxide adsorbing sulfate ions, as described by Examples 1 to 3, but it is apparent that this method is by no means economical because the regeneration efficiency is low and a large amount of the expensive cation exchange resin is required for carrying polymeric zirconium hydrous oxide. Furthermore, in this method, the polymeric zirconium hydrous oxide adsorbing sulfate ions comes into contact with acidic brine containing sulfate ions, hence loss of the polymeric zirconium hydrous oxide due to acid-induced dissolution of the polymeric zirconium hydrous oxide is caused to result in increasing cost, and the dissolved zirconyl ions precipitate again in the form of a hydroxide in the lower portion of the vessel to thus clog a flow path, and therefore the method can not be applicable stably or economically.

Meanwhile, disclosed in Japanese Laid-Open Patent Publication No. 228691/85 is the method in which brine containing sulfate ions is diluted to an alkali metal chloride content of not more than 120 g/l to cause the sulfate ions to be adsorbed to anion exchange resin and the anion exchange resin adsorbing sulfate ions is caused to be regenerated in an aqueous solution of an alkali metal chloride with a concentration of not less than 280 g/l. As described in the specification of the aforementioned publication, however, this method consists in adding a concentration process by the ion exchange method to the known sulfate ion removing technique, hence it has a disadvantage of increasing cost as compared with conventional methods.

SUMMARY OF THE INVENTION

It is an object of the present invention to provide a method for removing sulfate ions from brine, in which adsorption and desorption take place very rapidly and efficiently.

Other objects and advantages of the present invention will be apparent from the following detailed description.

After an intensive series of studies, the present inventors have found out a substance suited for adsorption of sulfate ions in brine and developed an economical and efficient regeneration technique.

DETAILED DESCRIPTION OF THE INVENTION

The present invention relates to a method for removing sulfate ions from brine, wherein the brine containing sulfate ions and zirconium hydrous oxide are brought into contact with each other to make a slurry under acidic conditions to thereby cause the sulfate ions to be adsorbed to the zirconium hydrous oxide by an ion exchange reaction, and the zirconium hydroxide adsorbing sulfate ions is separated from the brine and then dispersed in another aqueous liquid to react with an alkali so as to cause sulfate ions to be desorbed into the aqueous liquid.

The zirconium hydrous oxide used in the present invention is in a powder form before use and preferably 1 to 20 $\mu$m, more preferably 5 to 10 $\mu$m, in a particle size of integrated 50% by weight measured by Sedigraph method on the principle of X-ray transmission. When the particle size of zirconium hydrous oxide is less than 1 $\mu$m, efficiency of solid-liquid separation is lowered when such separation is made by filtration or the like and a loss of zirconium hydrous oxide out of the system increases to result in increasing cost. When the particle size of the zirconium hydrous oxide is more than 20 $\mu$m, the surface area of the zirconium hydrous oxide for an ion exchange reaction decreases, hence a larger amount of the zirconium hydrous oxide is required for removal of a given amount of sulfate ions, which brings about difficulty in handling the slurry and cost increase.

The ignition loss of the zirconium hydrous oxide used in the present invention is preferably 3 to 40% by weight, and more preferably 15 to 30% by weight. The ignition loss as referred to in the present invention is a division in a percentage of a difference between the weights before and after ignition for 1 hour at 1,000° C. by the weight before the ignition of the zirconium hydrous oxide after removing its adsorption water by drying for 16 hours at 40° C. The ignition loss is said to mean the proportion of bound water. When the ignition loss is less than 3% by weight, the ion adsorption capacity is low and a larger amount of zirconium hydrous oxide is required for removing a given amount of sulfate ions, which result in difficulty in handling the slurry and cost increase. When the ignition loss is more than 40% by weight, the mechanical strength of zirconium hydrous oxide particles is low and those are liable to be broken into smaller particles, resulting in lowering efficiency of solid-liquid separation by filtration or the like, increasing a loss of the zirconium hydrous oxide out of the system and increasing cost.

Typical examples of the brine containing sulfate ions applicable to the present invention are aqueous solutions of sodium chloride, potassium chloride, lithium chloride and the like.

The brine to which the present invention is applicable may be the whole of the brine flowing in the brine system or may be a part thereof taken out of the brine system.

The reaction by which sulfate ions are adsorbed to zirconium hydrous oxide is supposed to be represented by the following formula (1).

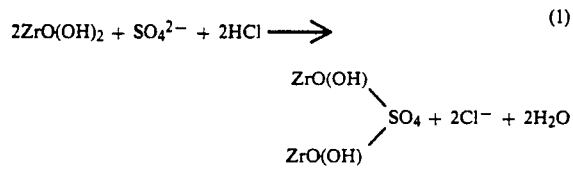

In order to keep zirconium hydrous oxide in the form of an acidic slurry, an acid such as hydrochloric acid and nitric acid is added, wherein hydrochloric acid is preferable since it has the same anions as those of the brine which is an aqueous solution of an alkali metal chloride and from which sulfate ions are removed. The pH of the slurry is preferably within the range of 2 to 7, more preferably 3 to 6, although it can not be generally said so since the acidity of the slurry varies according to the concentration of zirconium hydrous oxide, the concentration of sulfate ions to be removed by adsorption and so on. When the pH of the slurry is lower than 2, the dissolution amount of zirconium hydrous oxide increases, resulting in increasing a loss thereof from the system and increasing cost. When the pH is higher than 7, the sulfate ion adsorption capacity of zirconium hydrous oxide decreases, and hence, a larger amount of zirconium hydrous oxide is required for removal of a given amount of sulfate ions, thus resulting in difficulty in handling the slurry and cost increase.

There is no particular limitation in respect to the concentration of alkali metal chloride of the brine containing sulfate ions, and removal by adsorption of sulfate ions are feasible regardless of the concentration. The adsorption of sulfate ions may be conducted at a normal temperature but it is preferably conducted at a temperature of not less than 40° C., more preferably not less than 50° C., for efficient separation of zirconium hydrous oxide in a later process. This is because the viscosity of the brine lowers with temperature rise and the velocity of separating zirconium hydrous oxide from the brine increases.

The amount of zirconium hydrous oxide is preferably 0.5 to 30 times the mol of the sulfate ions contained in the brine, although it can not be generally said so since the required amount of zirconium hydrous oxide depends on the amount of sulfate ions to be removed, the acidity of the slurry and the like. In the case of the treatment of the whole amount of the brine in the brine system, the required removal ratio of sulfate ions (a proportion of the amount of sulfalte ions removed to the whole amount of sulfate ions) of approximately 10% can be high enough, and hence, the amount of zirconium hydrous oxide of approximately 0.5 to 5 times the mol of such the whole of sulfate ions suffices. On the other hand, in the case of the treatment of a part of the brine taken out of the brine system, the required amount of zirconium hydrous oxide depends on the parting ratio (a proportion of the amount of the brine taken out of the system to the whole amount of the brine). When the parting ratio is 10%, for example, 5 to 30 times the mol of the sulfate ions taken out of the system is preferred. When the amount of zirconium hydrous oxide used is less than the aforementioned amount, it is difficult to achieve the intended removal ratio. When the intended removal ratio can be less than the ratio described above, it is needless to say that a less amount thereof suffices. If the amount used thereof is more than the aforementioned amount, the slurry concentration becomes too high, resulting in difficulties in handling the slurry and in separating zirconium hydrous oxide from the brine in a later process.

According to the aforementioned slurry method, the adsorption velocity of sulfate ions is very high and the reaction is completed normally within a minute. This is because zirconium hydrous oxide is used in a slurry form and thus an extremely large contact area between the zirconium hydrous oxide and the brine is obtained, which is one of the advantages of the present invention. High controllability of the acidity of the slurry, which prevents loss of zirconium hydrous oxide caused by excessive addition of an acid, is also one of the advantages of the present invention.

The zirconium hydrous oxide adsorbing sulfate ions is separated from the brine, and for its separation there are known methods such as a centrifugal separation method, a suction filtration method and a pressure filtration method. The zirconium hydrous oxide adsorbing sulfate ions is separated from the brine, and dispersed in another aqueous liquid, where sulfate ions are desorbed by a reaction of the zirconium hydrous oxide adsorbing sulfate ions with an alkali. The reaction may be carried out by adding the alkali after dispersion of the zirconium hydrous oxide adsorbing sulfate ions in an aqueous liquid or it may be carried out by adding the zirconium hydrous oxide adsorbing sulfate ions and the alkali into an aqueous liquid at the same time. It is then desirable to stir the aqueous liquid by a proper method, for example, by the use of a stirrer, to ensure smooth progress of the reaction.

The aqueous liquid used for desorption includes water or aqueous solutions of water-soluble substances such as alkali metal chlorides and alkali metal sulfates. Any alkali that increases a pH of the aqueous liquid to higher than 7 can be used, and preferred are alkali metal hydroxides, ammonium hydroxides, tetra-alkyl ammonium hydroxides, etc., of which high alkalinity and solubility are effective for enhancing desorption of sulfate ions. When the liquid after desorption is drained away, alkali metal hydroxides are most preferred from an economical viewpoint.

The reaction by which sulfate ions are desorbed from the zirconium hydrous oxide is represented by the following formula (2).

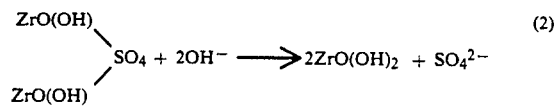

As seen from the foregoing formula (2), the theoretical value of the amount of an alkali to be added is 2 times the mol of sulfate ions, and hence, it is desirable to add an amount of an alkali close to the aforementioned theoretical value. As the amount of an alkali to be actually added, 1.5 to 3 times the mol of sulfate ions adsorbed is preferred, more preferably 1.8 to 2.5 times. If the amount of an alkali added is less than 1.5 times the mol of the sulfate ions adsorbed, the desorption ratio of sulfate ions is lowered and the adsorption ratio is also lowered when the zirconium hydrous oxide is reused. On the other hand, the amount of an alkali more than 3 times the mol of sulfate ions means excessive addition, resulting in cost increase.

The desorption of sulfate ions may be carried out at a normal temperature, but for efficient separation of zirconium hydrous oxide in a later process, the temperature is preferably not less than 40° C., more preferably not less than 50° C. This is because viscosity of an aqueous liquid decreases with temperature rise, thus increasing a separation velocity. According to the present invention, the desorption reaction velocity of sulfate ions is very high and the reaction is normally completed within a minute. As in the case of adsorption, this is because of an extremely large contact area between the aqueous liquid and the zirconium hydrous oxide adsorbing sulfate ions due to the slurry form of the zirconium hydrous oxide, and such a large cantact area is an advantage of a slurry method.

Zirconium hydrous oxide used in the present invention may be used only once and then thrown away or may be reused for some other purposes, but the reuse of the zirconium hydrous oxide after regeneration for removal of sulfate ions is economical. In the case of the reuse, the zirconium hydrous oxide after regeneration is usually separated from the aqueous liquid by the same separation method as described above. Since the sulfate ion adsorption capacity of the zirconium hydrous oxide after regeneration is restored, the zirconium hydrous oxide can be reused by being dispersed again in brine containing sulfate ions. It is desirable to return the filtrate of the slurry after adsorption of sulfate ions to the brine system and to purge the filtrate of the slurry after desorption of sulfate ions of the system.

The present invention is described below more specifically by means of examples but the invention is in no way limited thereto.

EXAMPLE

Adsorption Test

After zirconium hydrous oxide (particle size of integrated 50% by weight: 7.5 μm, ignition loss: 20% by weight) was added to depleted brine (NaCl 200 g/l, $Na_2SO_4$ 6.2 g/l) which was obtained from an electrolytic process by an ion exchange membrane method and of which chlorine was removed and further hydrochloric acid was added, the reaction was carried out for 10 minutes at 50° C. The sulfate ion removal ratio was measured when the amount added of zirconium hydrous oxide and the acidity of the slurry were changed. The results are shown in Table 1.

TABLE 1

| Test No. | Amount added of zirconium hydrous oxide (times mol) | Acidity of slurry (pH) | Sulfate ion removal ratio (%) |
|---|---|---|---|
| 1 | 5.5 | 3.0 | 44 |
| 2 | 11.0 | " | 88 |
| 3 | 16.5 | " | 100 |
| 4 | 22.0 | " | 100 |
| 5 | 5.5 | 4.0 | 34 |
| 6 | 11.0 | " | 68 |
| 7 | 16.5 | " | 100 |

TABLE 1-continued

| Test No. | Amount added of zirconium hydrous oxide (times mol) | Acidity of slurry (pH) | Sulfate ion removal ratio (%) |
|---|---|---|---|
| 8 | 22.0 | " | 100 |
| 9 | 5.5 | 5.0 | 25 |
| 10 | 11.0 | " | 50 |
| 11 | 16.5 | " | 75 |
| 12 | 22.0 | " | 100 |

Desorption Test

The zirconium hydrous oxide adsorbing sulfate ions obtained in Test No. 7 in Table 1 was separated from the brine by suction filtration. After the resulting zirconium hydrous oxide was dispersed in deionized water and caustic soda (NaOH 30%) was added, the reaction was carried out for 10 minutes at 50° C. The sulfate ion desorption ratio (a proportion of the amount of sulfate ions desorbed to the amount of sulfate ions adsorbed) was measured when the proportion of the amount added of the alkali to the amount of sulfate ions adsorbed was changed. The results are shown in Table 2.

TABLE 2

| Test No. | Amount added of caustic soda (times mol) | Desorption ratio (%) |
|---|---|---|
| 13 | 1.0 | 48 |
| 14 | 1.5 | 70 |
| 15 | 2.0 | 95 |
| 16 | 2.5 | 100 |
| 17 | 3.0 | 100 |

REFERENCE EXAMPLE

The same zirconium hydrous oxide as used in Example was used and adsorption and desorption of sulfate ions were repeated 100 times under the following conditions, but the ion exchange capacity of the ziromium hydrous oxide was not lowered.

| Adsorption conditions: | |
|---|---|
| Slurry pH | 4.5 ± 0.2 |
| Slurry concentration | 16 ± 1 times mol |
| Temperature | 50 ± 2° C. |
| Desorption conditions: | |
| Amount added of caustic soda | 2.1 ± 0.1 times mol |
| Temperature | 50 ± 2° C. |

The present invention, where sulfate ions are adsorbed to zirconium hydrous oxide under acidic conditions and after separation of the zirconium hydrous oxide adsorbing sulfate ions, the sulfate ions adsorbed are desorbed in an aqueous liquid by the use of hydroxy ions, is based on the discovery that the ion exchange reaction rate is high since zirconium hydrous oxide is used in a slurry form.

The method of the present invention is more economical than any conventional methods since it allows selective removal of sulfate ions from brine and it uses hydrochloric acid and alkali hydroxide which are not costly chemicals. Moreover, since zirconium hydrous oxide and brine are brought into contact in a slurry form, velocity of adsorption or desorption is very high and apparatuses therefor can be made quite compact. Further, since slurry pH in the reaction of adsorption or desorption is well controllable, the amounts of acid and alkali used for pH control can be properly restricted, excessive addition of acid can be prevented without fail and loss of zirconium hydrous oxide can be prevented, which is also highly advantageous.

What is claimed is:

1. A method for removing sulfate ions from an aqueous solution of an alkali metal chloride containing sulfate ions, which comprises contacting the solution with a slurry of zirconium hydrous oxide powder, said slurry having a pH of 2 to 7, whereby the sulfate ions react with and are adsorbed onto the zirconium hydrous oxide, and separating the zirconium hydrous oxide having sulfate ions adsorbed thereon from the solution.

2. A method according to claim 1, wherein hydrochloric acid is added to the slurry.

3. A method according to claim 1, wherein the zirconium hydrous oxide having sulfate ions adsorbed thereon is contacted with an aqueous alkaline solution to desorb the sulfate ions.

4. A method according to claim 1, wherein the zirconium hydrous oxide powder has a particle size of 1 to 20 μm.

5. A method according to claim 1, wherein the zirconium hydrous oxide powder contains 3 to 40% by weight of water.

* * * * *